United States Patent
Dreyfuss et al.

(10) Patent No.: US 11,379,308 B2
(45) Date of Patent: Jul. 5, 2022

(54) DATA PROCESSING PIPELINE FAILURE RECOVERY

(71) Applicant: Zoox, Inc., Foster City, CA (US)

(72) Inventors: Ethan Petrick Dreyfuss, Redwood City, CA (US); Michael Haggblade, El Dorado Hills, CA (US); Hao Li, San Jose, CA (US); Andres Guillermo Morales Morales, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 104 days.

(21) Appl. No.: 16/215,557

(22) Filed: Dec. 10, 2018

(65) Prior Publication Data
US 2020/0183788 A1  Jun. 11, 2020

(51) Int. Cl.
*G06F 11/14* (2006.01)
*G06F 9/30* (2018.01)

(52) U.S. Cl.
CPC ...... *G06F 11/1402* (2013.01); *G06F 9/30079* (2013.01); *G06F 2201/805* (2013.01); *G06F 2201/82* (2013.01)

(58) Field of Classification Search
CPC .... G06F 11/073; G06F 11/076; G06F 11/167; G06F 11/1443; G06F 11/1402; G06F 9/30079; G06F 2201/805; G06F 2201/82
See application file for complete search history.

(56) References Cited

U.S. PATENT DOCUMENTS

| | | | | | |
|---|---|---|---|---|---|
| 4,701,915 | A | * | 10/1987 | Kitamura | G06F 9/38 714/6.24 |
| 4,783,783 | A | * | 11/1988 | Nagai | G06F 9/3865 712/E9.06 |
| 5,247,627 | A | * | 9/1993 | Murakami | G06F 7/575 712/236 |
| 5,953,511 | A | * | 9/1999 | Sescila, III | G06F 13/4027 710/315 |
| 6,028,638 | A | * | 2/2000 | Kim | H04N 19/523 375/240.16 |
| 9,232,010 | B1 | * | 1/2016 | Gajapala | H04L 67/16 |
| 10,552,440 | B1 | * | 2/2020 | Janyavula | G06F 16/254 |

(Continued)

OTHER PUBLICATIONS

PCT Search Report and Written Opinion dated Mar. 5, 2020 for PCT Application No. PCT/US2019/065104, 9 pages.

*Primary Examiner* — Matthew M Kim
*Assistant Examiner* — Matthew N Putaraksa
(74) *Attorney, Agent, or Firm* — Lee & Hayes, P.C.

(57) ABSTRACT

Techniques are disclosed for re-executing a data processing pipeline following a failure of at least one of its components. The techniques may include a syntax for defining a compute graph associated with the data processing pipeline and receiving such a compute graph in association with a specific data processing pipeline. The technique may include executing the data processing pipeline, determining that a component of the data processing pipeline failed, and determining a portion of the data processing pipeline to execute/re-execute based at least in part on dependencies defined by the data processing pipeline in association with the failed component. Re-executing the one or more components may comprise retrieving an output saved in association with a component upon which the failed component depends.

21 Claims, 7 Drawing Sheets

(56) References Cited

U.S. PATENT DOCUMENTS

| | | | |
|---|---|---|---|
| 2006/0288196 A1* | 12/2006 | Unsal | G06F 9/3861 |
| | | | 712/E9.06 |
| 2011/0185156 A1* | 7/2011 | Dosh | G06F 9/3005 |
| | | | 712/E9.062 |
| 2012/0233326 A1* | 9/2012 | Shaffer | H04W 40/023 |
| | | | 709/225 |
| 2013/0232174 A1 | 9/2013 | Krajec et al. | |
| 2015/0331775 A1* | 11/2015 | Slik | G06F 11/1451 |
| | | | 714/6.23 |
| 2016/0261727 A1* | 9/2016 | Yang | H04L 65/4069 |
| 2016/0291977 A1* | 10/2016 | Bai | G06F 9/4881 |
| 2016/0358103 A1 | 12/2016 | Bowers et al. | |
| 2017/0024268 A1* | 1/2017 | Kimura | G06F 9/30105 |
| 2017/0093672 A1* | 3/2017 | Zhao | H04L 43/0817 |
| 2017/0147345 A1* | 5/2017 | Clevenger | G06F 9/30079 |
| 2017/0187792 A1* | 6/2017 | Zhao | H04L 47/803 |
| 2017/0220403 A1* | 8/2017 | Maag | G06F 11/3692 |
| 2017/0242715 A1 | 8/2017 | Chambers et al. | |
| 2017/0330081 A1 | 11/2017 | Lindsley | |
| 2019/0121566 A1* | 4/2019 | Gold | G06N 3/063 |
| 2019/0311254 A1* | 10/2019 | Turek | G06T 7/11 |
| 2019/0384577 A1* | 12/2019 | Seif | G06F 16/2246 |
| 2020/0183788 A1* | 6/2020 | Dreyfuss | G06F 11/1402 |
| 2020/0210301 A1* | 7/2020 | Nandan | G06F 11/2236 |

* cited by examiner

DATA PROCESSING PIPELINE FAILURE RECOVERY

BACKGROUND

Machines have increased in complexity and have increasingly been controlled by electronic systems. Electronic control systems often rely on data processing pipelines in order to make sense of the data gathered by sensors and/or to exert control over a machine. For example, a data processing pipeline may be used to control a manufacturing process, track multiple conversations in a room and convert audio to text while identifying distinct speakers, control motion of an autonomous robot through an environment, coordinate movements of microscopic nanotubes via chemical stimulus and/or biofeedback, etc. These data processing pipelines may be composed of hundreds, or even thousands, of components.

At times, a component of a pipeline may fail for one reason or another—the component may not have received an input it needed to properly execute, the component may have erroneously executed (e.g., due to a hardware failure, due to a software "bug"), the component may have been paused, physical failures (such as power failures) may cause systems to shut down, etc. Because of the complexity of the pipeline, the failure may go unnoticed and/or it may be difficult to identify which component failed.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
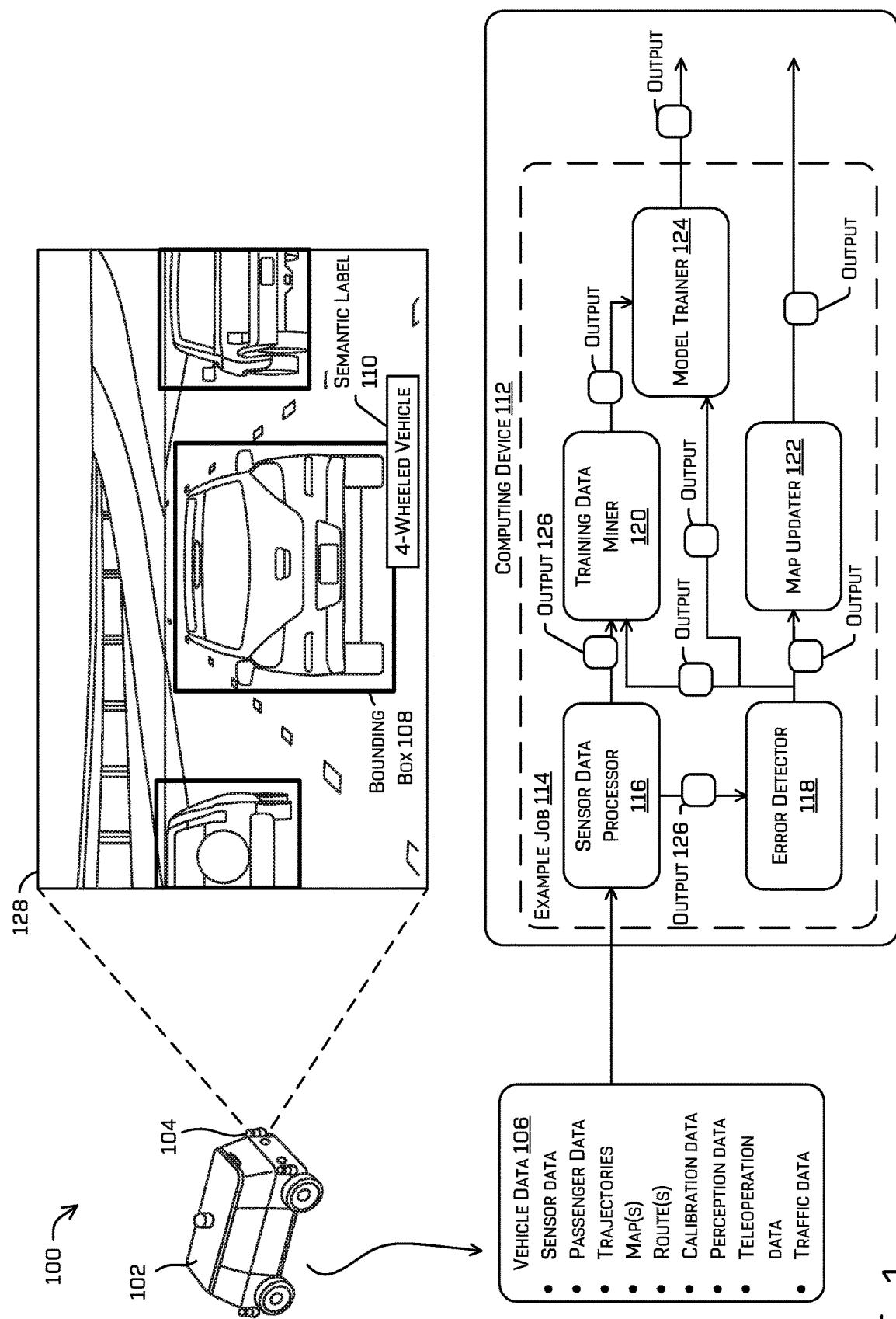
FIG. 1 illustrates an example scenario in which an autonomous vehicle may incorporate data processing pipeline that comprises multiple components.

As discussed above, systems may comprise complex data processing pipelines that may obscure a failure of a component of the processing pipeline when executing. Moreover, re-executing the processing pipeline to rectify the failure may be highly inefficient since many of the components may have executed successfully and re-executing the pipeline would therefore be duplicating work, thereby wasting energy consumed by a computing device, time, and/or delaying other tasks. In a simplistic example, a processing pipeline may comprise 100 components and, after a first execution of the processing pipeline, 97 of the components may have executed properly. Re-executing the 100 components to rectify the failure of 3 components may be highly inefficient.

In additional, a pipeline may include different types or implementations of components—a first component may be implemented in software executed by a processor and a second component may be implemented as hardware such as a field-programmable gate array (FPGA) or an application-specific integrated circuit (ASIC), or in an additional or alternate example, a first component may be implemented in a kernel layer of an operating system, a second component may be implemented in an application layer of the operating system, and a third component may be implemented in an application layer of a different operating system. Further, some complex pipelines include components of the data pipeline that operate in parallel on different computing nodes (e.g., different graphics processing unit (GPU) pipelines and/or different GPUs, different central processing unit (CPU) core(s) and/or different CPUs, different machines connected over a network, different virtual machines), which may be necessary in some applications to achieve an operating speed useful for controlling a machine in real-time. The diversity of the components and the computing environments thereof may further obfuscate failure of a single component in a complex pipeline. Moreover, in some examples, the pipeline may execute thousands of times in a minute, further obfuscating a singular failure of a component in just a minute of operation.

Regardless of the use case, this disclosure discusses techniques pertinent to efficiently re-executing component(s) of a job (e.g., a data processing pipeline, a computer vision system, a perception component, an application executed by a computer) that have previously failed. As used herein, a job may comprise one or more components. A component may, itself, comprise multiple elements (e.g., various combinations of hardware and/or software). In general, a component may be a task (e.g., a process, a function, a thread, some unit of execution) executable by one or more processors.

The techniques discussed herein may comprise a computer programming syntax for defining dependencies between components of a job (e.g., tasks from which the component receives input, tasks to which the component provides an output of the task). For example, the syntax may define that a first component may receive as an input (e.g., an argument) an output of a second component. The first component could be said to be dependent on or downstream from the second component. In some cases, a component may be dependent on or downstream from one or more components. Each component of a job may comprise a definition. The techniques may generate a compute graph from the definitions of the components of a job. A definition associated with a component may additionally or alternatively define a computational environment in which the component runs (e.g., an operating system for which the component is configured, a process that owns the component), execution constraints (e.g., preferred hardware for execution, e.g., CPU, GPU, ASIC), a retry budget (e.g., a number of times to re-execute the component after failure of the component before taking a different action other than attempting re-execution), instructions following failure (e.g., whether to re-execute, what to do when the retry budget is exhausted, instructions to output a default (predefined) output instead of an output determined by the component), and/or binary code associated with the component (e.g., the code itself, a pointer thereto).

In some examples, the techniques may comprise receiving a job comprising multiple components and generating a compute graph from the definitions associated therewith. The techniques may cause the job to execute, which may comprise causing the components of the job to execute. In some instances, causing the job to execute may comprise scheduling the one or more components for execution based at least in part on the compute graph. A scheduler may schedule one or more components of the job to execute serially, in parallel, substantially simultaneously (within technical tolerances), synchronously, and/or asynchronously.

In some instances, the scheduler may generate (and/or otherwise receive) exit codes responsive to scheduling a component to execute. For example, different exit codes may indicate different results of scheduling the component to execute.

In some examples, an execution management component may generate the compute graph and communicate with the scheduler to cause the components of the job to be executed. The execution management component may additionally or alternatively determine an augmented compute graph as the job executes. In addition to any data already associated with a component as discussed above, the augmented compute graph may comprise a status of execution of the component and/or an output of the component. For example, the execution management component may receive an exit code from the scheduler in association with a component and the execution management component may update the status of the component in the compute graph based at least in part on the exit code. The states may vary as widely as the exit codes or, in some examples, the execution management component may store a simplified state such as, for example, execution pending, scheduled, successful, paused, failed, fatally failed, etc. A fatal failure may differ from a failure in that a fatal failure may be unrecoverable. For example, a component may fatally fail by being scheduled on a machine that does not have hardware that the component must execute on, the component does not receive an input necessary to execute, etc. In examples where a component at least partially executes, the execution management component may store output of the component in a data store in association with the compute graph.

In some instances, the scheduler may generate an indication that the job is finished executing, which may not mean that the job executed successfully. Regardless, the execution management component may receive an indication that the job is finished executing and the execution management component may determine that one or more of the components of the job did not execute successfully based at least in part on determining that the augmented compute graph is associates the one or more components with a failed state.

Upon determining that the augmented compute graph indicates that a component failed to execute successfully, the execution management component may determine whether the compute graph indicates any dependencies related to the component, whether they be upstream components and/or downstream components. If the execution management component determines that the component depends upon a component for input (e.g., an "upstream" component), the execution management component may determine whether an output has been stored in association with the upstream component. If the upstream component executed successfully, the execution management component may store an output of the upstream component, preserving it so that the upstream component does not need to be re-executed in order to properly execute any downstream components that fail. In some instances, regardless of whether a component executes successfully, the execution management component may store an internal state of the component during and/or after an execution of the component. In some examples, an internal state may comprise variable values, counter values, weights of a neural network, partially-processed outputs, prior values such as input(s), etc. If no output was stored, the execution management component may cause the upstream component to re-execute along with the component that failed. In some instances, if the upstream component is dependent on components upstream from the upstream component, the execution management component may re-execute those components and/or retrieve outputs associated with those components to re-execute the upstream component. However, if an output was stored for the upstream component, the execution management component may provide the output to the failed component as input and cause the failed component to re-execute. The execution management component may additionally or alternatively cause any components downstream from (dependent for input on) the failed component to be re-executed (or executed for a first time if the job was paused, terminated, etc. after the failure).

In some instances, after executing a job, an additional component may be added to the job and/or may replace an existing component in the job. The execution management component may update the compute graph to reflect the additional component and may determine whether any other components are dependent upon the additional component for input. If so, the execution management component may cause the additional component to execute and may cause the components downstream from the additional component to execute based at least in part on the output of the additional component.

In an additional or alternate example, an output of a component may be replaced with a second output. The execution management component may determine, based on the compute graph, any components that are downstream from a component associated with the second output and may cause those downstream components to re-execute based at least in part on the second output.

The techniques described herein may reduce the number of compute cycles dedicated to re-executing components, and may thereby reduce redundant compute cycles, heat expelled by processor(s), energy consumed, amount of time to achieve an output, etc. Furthermore, some jobs and/or components may not be designed to run twice and may be corrupted by being re-executed without being re-initialized. The techniques discussed herein enable stopping a component and/or pipeline mid-compute, gathering whatever output(s) the component may have generated so far, and completing running the component and/or pipeline at a later time. The compute graph may also allow corruptible components to be identified and excluded from re-executions. Moreover, the techniques enable the ability to retrospectively modify a job's behavior, even when the job has already been run, to generate a new output. For example, a component may be added and/or replace another component and the job may be re-executed based at least in part on the added/replaced component.

In some instances, the techniques described herein may improve the safety and efficiency of an autonomous vehicle by reducing the time to re-execute a job and/or preventing failed component execution(s) to go unnoticed.

Example Scenario

FIG. 1 illustrates an example scenario 100 including an autonomous vehicle 102. According to the techniques discussed herein, the autonomous vehicle 102 may receive sensor data from sensor(s) 104 of the autonomous vehicle 102. For example, the sensor data may include a location signal (e.g., a GPS signal), an inertia signal (e.g., an accelerometer signal, a gyroscope signal, etc.), a magnetometer signal, a wheel encoder signal, a speedometer signal, a point cloud of accumulated LIDAR and/or RADAR points, an image (or images), an audio signal, bariatric or other environmental signals, etc.

The autonomous vehicle 102 may provide the sensor data received from such sensor(s) 104 to one or more systems of the autonomous vehicle 102 to accomplish a variety of functions of the autonomous vehicle. For example, one or more systems may control a passenger ride experience (e.g., temperature/humidity control, interior display control, door control functionality, seat functionality), a localization and/or mapping system may generate a map of surroundings of the autonomous vehicle and/or a position and/or orientation of the autonomous vehicle 102 within a map, perception system that may detect and track object(s) in an environment of the autonomous vehicle, a prediction system that may predict future positions, velocities, and/or accelerations of objects in the environment, a planning system that may determine a trajectory for controlling motion of the autonomous vehicle, etc. These systems may, in turn, include one or more components.

At least some of the data generated by the various systems of the autonomous vehicle 102 may be stored as vehicle data 106. For example, the vehicle data 106 may include sensor data, passenger data (e.g., how many passengers rode, data provided by the passengers), map(s) generated by the autonomous vehicle, route(s) traversed by the autonomous vehicle, calibration data (e.g., values of sensor calibration), perception data (e.g., data generated from sensor data that reflects understanding of the environment surrounding the autonomous vehicle 102 such as, for example, bounding box 108, semantic label 110, etc.), teleoperation data (e.g., data provided from a teleoperation device to the autonomous vehicle 102), traffic data, etc.

The system(s) of the autonomous vehicle 102 may run any of a number of job(s) which may each comprise one or more components. These component(s) may comprise software and/or hardware components. For example, a component may comprise a machine-learned model such as a neural network and/or other instructions executable by a processor. When a component comprises at least a software portion, "executing" the component may refer to causing one or more processors to execute code. When the component comprises at least a hardware portion "executing" the component may refer to causing the hardware to perform an operation.

For example, a job run by a perception system of the autonomous vehicle 102 may receive sensor data from the sensor(s) 104 and may generate, as output of one or more of the component(s) of the job, bounding box 108 and/or semantic label 110.

To further illustrate, in some instances, a computing device 112 may receive at least part of the vehicle data 106. For example, the autonomous vehicle 102 may continuously and/or periodically transmit the vehicle data 106 to the computing device 112 and/or upon the occurrence of an event (e.g., the autonomous vehicle 102 returns to a base station for charging/repairs). Based at least in part on receiving the vehicle data 106, the computing device 112 may run example job 114, which may comprise a variety of components. For example, example job 114 may comprise a sensor data processor 116, error detector 118, training data miner 120, map updater 122, and/or model trainer 124. Example job 114 is given purely for example, the number and/or complexity of the components thereof may vary greatly depending on the job. For example, a job may comprise singular to hundreds of thousands or more components.

In general, the techniques discussed herein may be implemented by the computing device 112, although it is understood that the techniques discussed herein may be implemented by another computing device. In some instances, the computing device 112 may be used to train, test, and/or validate component(s) of one or more jobs run by the autonomous vehicle 102. After training, testing, and/or validating component(s) (using the techniques discussed herein), the computing device 112 may transmit the component(s) to the autonomous vehicle 102 to update job(s) of the autonomous vehicle 102. Components of the autonomous vehicle should be fail-proof, so the techniques discussed herein may be designed for computing device 112, although it is understood that the techniques discussed herein may be implemented by any computing device, including computing device(s) of the autonomous vehicle 102.

Example job 114 may comprise a sensor data processor 116 which may receive, normalize, smooth, convert, and/or otherwise preliminarily process the sensor data. In some examples, the sensor data processor 116 may comprise sub-components such as, for example, a Gaussian filter, a digital-analog converter (DAC), a sensor driver, etc. The sensor data processor 116 may transmit output 126 generated by the sensor data processor 116 to one or more downstream components, which, in the depicted example, may comprise error detector 118 and training data miner 120.

The error detector 118 may receive processed sensor data from the sensor data processor 116 (which is an upstream component in relation to the error detector 118) and may determine whether the vehicle data 106 contains any errors, for example, by determining that a component on the vehicle failed to execute, determining that a component on the vehicle was compromised (e.g., the component was corrupted, the component is associated with a hardware failure), attempting to identify false positives and/or false negatives in the vehicle data 106, etc. The error detector 118 may output the potential and/or actual errors detected from the vehicle data 106 to downstream components, which, in the depicted example, may comprise the training data miner 120 and the map updater 122.

The training data miner 120 may receive inputs from upstream components, sensor data processor 14 and error detector 118. The training data miner 120 may identify portions of the vehicle data 106 that may be used to train one or more machine-learned models. For example, the training data miner 120 may identify sensor data associated with a request for teleoperator assistance, sensor data associated with "rare" object classifications (e.g., cyclist), a bounding box 108 generated by the autonomous vehicle 102, a semantic label 110 generated by the autonomous vehicle, an image 128 captured by the vehicle (as part of the sensor data), etc. The training data miner 120 may additionally or alternatively store or otherwise associate format a subset of the vehicle data 106 for use in training a machine-learned model.

The map updater 122 may receive output 126 (though not depicted for clarity purposes) and/or output from the error detector 118 and may update a map disseminated to autonomous vehicles based at least in part on map(s) generated by autonomous vehicle 102 and/or other portion(s) of vehicle data 106. In some instances, this may include modifying temporal indications in a map such as, for example, an indication that a portion of a roadway (e.g., certain lane(s), length of a lane) is under construction and/or that the portion that is under construction has shifted. In some instances, this may additionally or alternatively comprise modifying traffic data associated with the map (e.g., a maximum traffic volume per time associated with the section, adding additional time-to-traverse the roadway). The map updater 122 may output modifications to a map and/or a new map.

The model trainer 124 may amalgamate a variety of inputs received from upstream components, including training data output by the training data miner 120 and/or error(s) detected by the error detector 118, etc. In some instances, the model trainer 124 may train a new machine-learned model and/or update an existing machine-learned model based at least in part on inputs received at the model trainer 124. The model trainer 124 may then output a new machine-learned model and/or modifications to an existing machine-learned model.

It is contemplated that each of the components discussed herein may, in some examples, comprise multiple sub-components such as, for example, multiple machine-learned models, processor-executable instructions ("code"), and/or hardware (e.g., an FPGA and/or an ASIC).

The example job 114 is illustrated and explained above merely to give one skilled in the art context for what is meant by a "system," a "component," and/or sub-components. Potential examples of jobs may comprise mapping, calibration, simulation of logged data using updated components, component testing, component integration testing, data processing, etc., although it is contemplated that there are myriads of possible jobs.

Example Compute Graph

Figure 2:
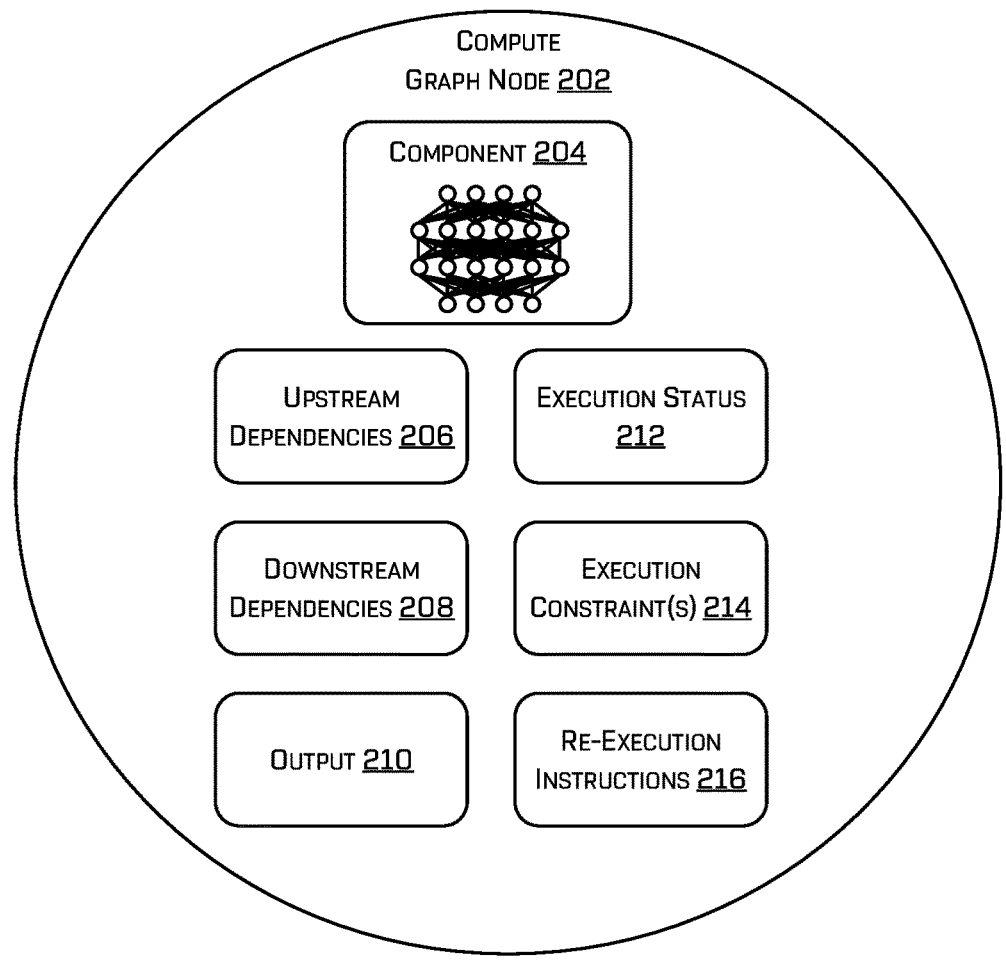
FIG. 2 illustrates a block diagram of an example syntax for defining a compute graph node.

FIG. 2 illustrates a block diagram of an example syntax 200 for defining a compute graph node 202. In some instances, a compute graph node may be associated with one component of a job (e.g., a data processing pipeline, an application executing on one or more processors), although, in other examples, a compute graph node may be associated with multiple components of a job. The compute graph node 202 may be associated with a component 204. In some instances, the example syntax 200 may comprise a programming language for defining characteristics of the component 204 and/or the job associated therewith. A compute graph node 202 may be an object and/or data structure defined by the example syntax 200 associated with component 204.

The following discussion may comprise characteristics of a compute graph node 202 definable using the example syntax 200. The compute graph node 202 may include the component 204 and/or a reference thereto. For example, the compute graph node 202 may point to executable instructions stored in memory (e.g., binary code for an executable process, an executable thread, a machine-learned model), the compute graph node 202 may contain executable instructions itself, and/or may otherwise reference the component 204 and/or its functions (e.g., using a MAC address for a hardware portion of the component, an Internet Protocol (IP) address, a virtual private cloud (VPC) identifier). In some examples, the compute graph node 202 may identify a type associated with the component 204, e.g., software, hardware, machine-learned model, some combination thereof.

In some instances, the compute graph node 202 may additionally or alternatively define one or more upstream dependencies 206 associated with the component 204 and/or one or more downstream dependencies 208 associated with the component 204. For example, the example syntax 200 may receive an argument to define an upstream component(s) from which the component 204 receives an output, as an input to the component 204, and/or a downstream dependencies 208 that receives an output of execution of the component 204. In some instances, the upstream dependencies 206 may additionally define whether an output associated with an upstream component is optional and/or necessary for the component 204 to operate. In some examples, if an output of another component is necessary, but that output is not received during execution, the techniques may comprise generating a fatal failure and/or delaying execution/re-execution of the component until the output is received.

In some examples, the compute graph node 202 may additionally or alternatively define an output 210 of the component 204. For example, the definition of the output 210 may define a type of the output (e.g., analog signal, digital signal, mechanical actuation, file type(s), general description, e.g., video, image, point cloud) and/or other characteristics of the output (e.g., a normal range of values associated with the output, a number of output(s), a period associated with the output, e.g., a number of compute cycles to expect an output). In some instances, regardless of whether a component executes successfully, the execution management component may store an internal state of the component during and/or after an execution of the component. In some examples, an internal state may comprise variable values, counter values, weights of a neural network, partially-processed outputs, prior values, etc. The internal state saved may be sufficient to resume execution of the component at a point in execution, while preserving the determinism of the output (i.e., the internal state is saved so that the resultant output would not be different, regardless of being resumed). The internal state may therefore be defined per component or per type of component, since the internal states required to resume execution may be different between two different components. During run-time, the compute graph node 202 may additionally or alternatively identify, at the definition of the output 210, whether the component 204 generated an output responsive to being executed and/or whether the output generated by the component 204 was stored and/or is retrievable from a memory.

In some examples, the compute graph node 202 may additionally or alternatively define an execution status 212 of the component 204. For example, the execution status 212 may define possible execution states of the component 204 and/or, during run-time, the execution status 212 may identify a current and/or last execution status of the component 204. In some examples, the execution status 212 may comprise an exit code of a scheduler and/or the execution status 12 may be associated with an exit code of a scheduler. For example, there may be multiple exit codes that may be associated with a simplified status such as "failed." The execution status 212 may identify the exit code and/or a simplified status.

An exit code may indicate different results of scheduling a component to execute. For example, an exit code may comprise an indication that the component is ready to execute at a scheduled time, the component is currently executing, no additional executions are scheduled in association with the component, a time has not been scheduled for the component to be executed due to higher priority components that are to be executed, execution of the component was terminated by a user and/or another process, execution of the component failed due to hardware failure, execution of the component failed due to a software failure (e.g., a segmentation fault, network unavailability of remotely stored data, etc.), execution of the component was terminated by a user and/or a process, execution of the component was paused, the component could not be found, a database associated with the component was corrupted, an argument of the component is out of range, an instance of the component was already running, the scheduler is too busy to handle the request to execute a component, the component is not compatible with hardware and/or software upon which the scheduler scheduled the component to be executed, etc.

A simplified status may comprise, for example, execution pending, scheduled, successful, paused, canceled, failed, fatally failed, etc. It is understood that the statuses may include less and/or more statuses. Moreover, the statuses may be hierarchical (e.g., failure may be a parent to canceled, network unavailable, no input received, etc.) A fatal failure may differ from a failure in that a fatal failure may be unrecoverable. For example, a component may fatally fail by being scheduled on a machine that does not have hardware that the component must execute on, the component does not receive an input necessary to execute, etc. In some example, an execution management component may receive an exit code from a scheduler based at least in part on causing the component 204 to be executed and may store the exit code and/or status in association with the compute graph node 202/component 204. The execution management component may additionally or alternatively store a status independently of receiving an exit code (e.g., storing "execution pending" before causing the component 204 to be executed, storing a "failure" status upon detecting a hardware failure and/or software corruption).

In some examples, the execution status 212 may include ancillary data such as, for example, a time that the component 204 was scheduled to execute, started executing, finished executing, etc., an environment in which the component 204 was executed (e.g., a machine that executed the component 204, hardware associated with the execution), a reason for failure of the component 204 (e.g., this may be determined from an exit code and/or other information determined by a monitoring service). In some examples, the reason for failure may include information associated with an exit code, an indication of hardware unavailability (e.g., a disk died, a disk is full, a processor was unavailable, a machine was physically interfered with), identification of an input/output bottleneck, etc.

In some examples, the compute graph node 202 may additionally or alternatively define execution constraint(s) 214 associated with the component 204. The execution constraint(s) 214 may define an operational environment for executing the component 204. For example, the execution constraint(s) 214 may comprise preferred and/or required hardware upon which to execute the component 204 (e.g., CPU, GPU, ASIC), an environment type associated with the component 204 (e.g., hyper-threading permitted/not permitted, operating system type, license availability(ies) and/or restrictions on execution(s), compute budgetary limitations (e.g., cloud computing budgetary constraints for number of requests sent to a cloud computing service, compute time, machine(s) used, permissions to increase an expense tier of cloud computing usage), hardware operational level, e.g., firmware, middleware, user-space, virtual machine allowed/disallowed), a computational threshold (e.g., a minimum amount of memory, a minimum processor speed, a network availability (e.g., minimum network bandwidth, a maximum latency), a storage requirement (e.g., available RAM space, available disk space, memory read and/or write speed), machine topology (e.g., GPU must be connected by a PCIe connection instead of via a main bus, the machine is/is not a virtual machine), cluster topology (e.g., processor(s) must be located in a same rack of a cloud computing service to minimize an I/0 bottleneck, component must not be run on machine more than one rack away from a service), an error tolerance threshold for qubit information), a physical threshold (e.g., a maximum temperature for executing a software and/or hardware component, a minimum), a minimum security requirement (e.g., authentication and/or security elevation required to execute a component), etc. In some examples, a permutation of the execution constraint(s) 214 may define a computational environment and the execution constraint(s) 214 may define one or more permutations of computational environments in which a component may be executed. In some examples, permutation(s) of the computational environments may be prioritized and/or otherwise indicated as more or less preferred. In some examples, the execution constraint(s) 214 may identify an input consumed by the component 204 as input (e.g., a drive signal that causes a drive system to cause an autonomous vehicle to move, perception data such as a bounding box, image segmentation, semantic label, segmented point cloud, etc.) and/or an indication of whether the input is necessary and/or preferred for execution of the component 204.

In some instances, an execution management component may use the execution constraint(s) 214 and/or information received from a device executing the component 204 to determine an execution status 212. For example, the execution management component may store an "incompatible environment" or "compatible environment" status in addition or alternatively to the execution status 212.

In some examples, the compute graph node 202 may additionally or alternatively define re-execution instructions 216. Upon determining that the component 204 did not execute successfully, the execution management component may check the re-execution instructions 216. The re-execution instructions 216 may be null, which may allow the execution management component to follow a default re-execution procedure, and/or the re-execution instructions 216 may indicate that a component should not be re-executed if it was previously executed. In some examples, the re-execution instructions 216 may indicate a retry budget. The retry budget may define a number of times to re-execute the component 204 after the component does not execute successfully before taking a different action other than attempting re-execution. For example, upon exhaustion of the retry budget (e.g., the number of times the component has been retried meets the number of retries defined by the retry budget), instructions following failure (e.g., whether to re-execute, what to do when the retry budget is exhausted, instructions to output a default (pre-defined) output instead of an output determined by the component, instructions to output a fatal failure).

In some examples, the re-execution instructions 216 may associate different exit codes (or other reasons for failure) with different re-execution instructions 216. For example, an exit code identifying a disk failure may be associated with an instruction to migrate machines before re-executing; an exit code identifying the processor as being too busy to execute the component 204 may be associated with an instruction to retry at a later time, migrate to a different processor, etc.; an exit code identifying the component 204 as timing out waiting to receive an input may be associated with an instruction to determine whether an upstream component executed successfully, determine whether a network and/or input/output connection is working properly, determine whether an output associated with an upstream component was stored, etc.; an exit code associated with pausing execution of the component may be associated with an instruction to re-execute and/or execute from a saved internal state of the component 204; etc.

In some examples, the re-execution instructions 216 may additionally or alternatively comprise an instruction to replace a current compute graph with an alternate compute graph (and/or alternate compute graph node(s)). The re-execution instructions 216 may additionally or alternatively identify hard dependencies (e.g., input(s) from the upstream component is required for a component to execute successfully, a minimum required set of successfully executed component(s)) and/or soft dependencies (e.g. input(s) from the upstream component is not required for successful execution, but may be used by the component as an input). In some examples, a hard dependency may be defined by identifying a minimum number of upstream component(s) and/or particular upstream component(s) required for a component to execute and/or re-execute. In some examples, the re-execution instructions 216 may additionally or alternatively comprise an instruction to branch to a new process (e.g., a debug tool, an alternate version of a component, a different machine in examples where the component comprises hardware).

Example Compute Graph

Figure 3:
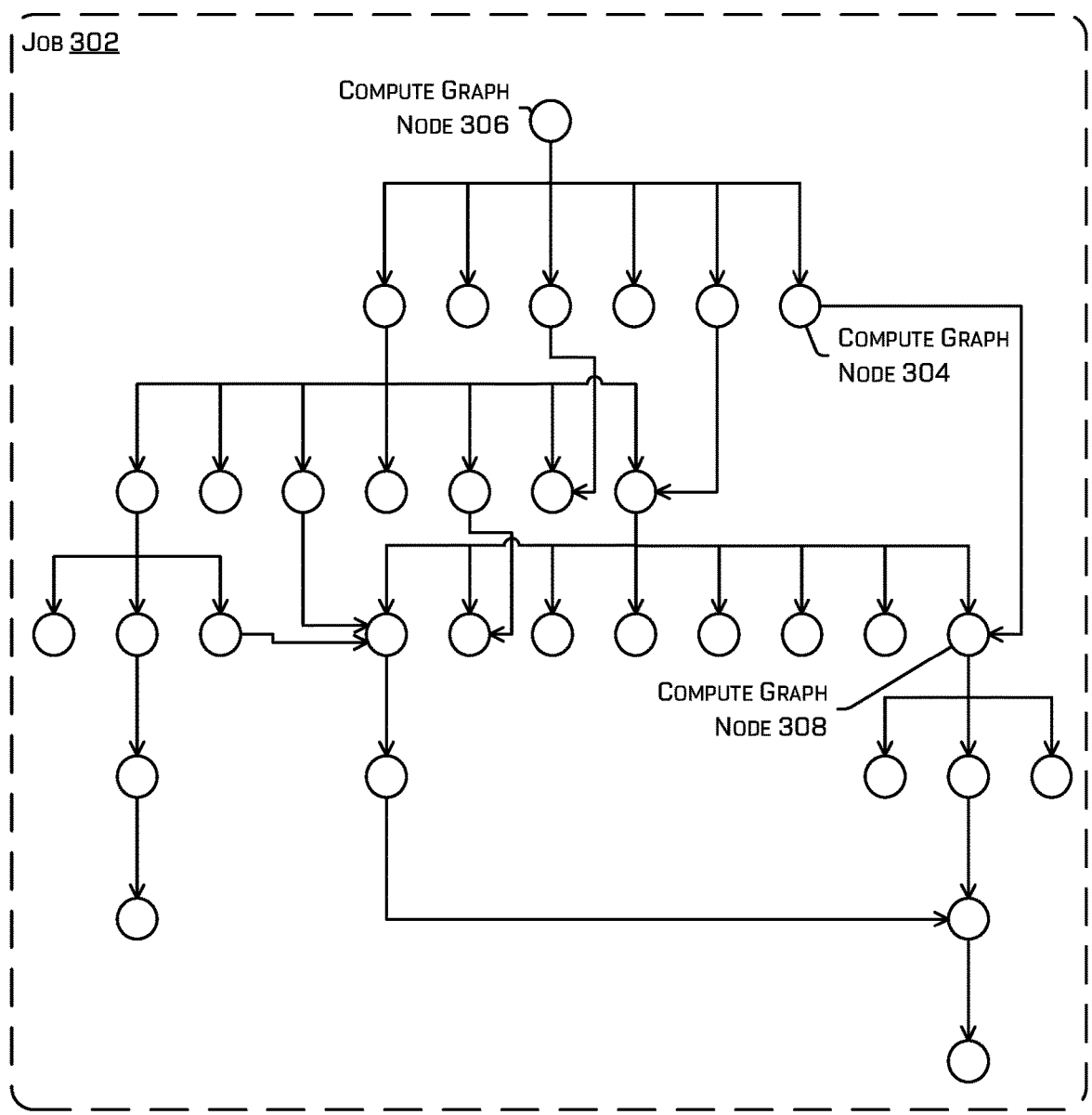
FIG. 3 illustrates a block diagram of an example compute graph associated with a job.

FIG. 3 illustrates a block diagram of an example compute graph 300 of a job 302. In the illustrated example, job 302 comprises a plurality of components indicated as circles. In some examples, an execution management component may receive a plurality of compute graph nodes associated with the plurality of components. As discussed above, the compute graph nodes may be programming language objects defined according to the syntax discussed above. The execution management component may generate the example compute graph 300 based at least in part on the compute graph nodes. In some instances, the example compute graph 300 may define dependencies of respective components, for example, based at least in part on upstream dependencies and/or downstream dependencies defined by the compute graph nodes. In some examples, the example compute graph 300 may additionally or alternatively indicate any of the data defined by the compute graph node 202.

FIG. 3 indicates dependencies as arrows. For example, compute graph node 304 may be downstream from (and thereby dependent for an input on) compute graph node 306 and may be upstream from compute graph node 308.

In some examples, an execution management component (e.g., an execution management component 630, discussed below) may generate the example compute graph 300 and/or store the example compute graph 300 in memory. The execution management component may update the example compute graph 300 based at least in part on receiving modifications to the job 302. For example, the example compute graph 300 may update the example compute graph 300 to include an additional or replacement compute graph node and/or to modify any of the data defined by the compute graph node, as discussed above.

Figure 4:
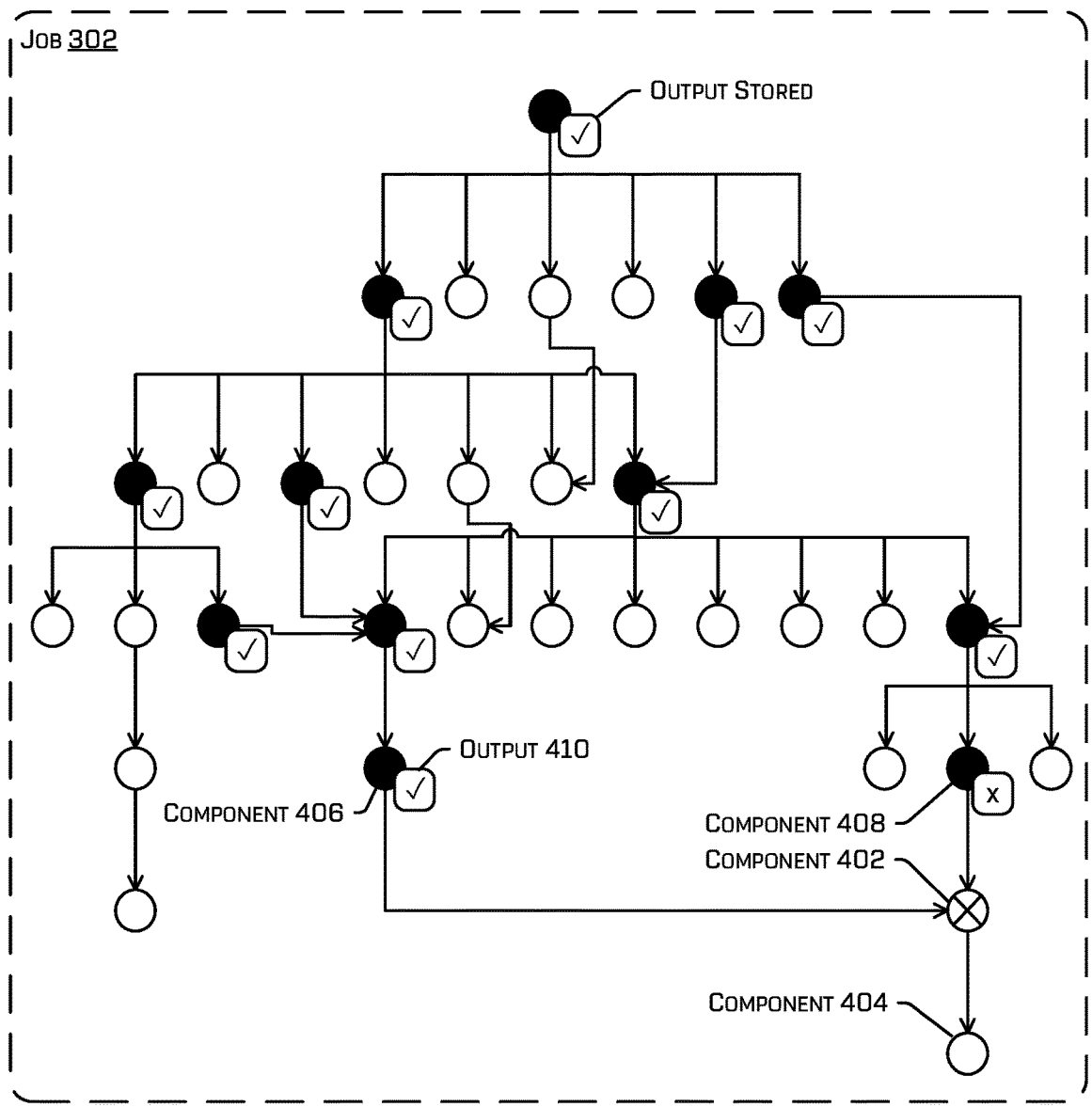
FIG. 4 illustrates a block diagram of an example augmented compute graph associated with a job.

FIG. 4 illustrates a block diagram of an example augmented compute graph 400 of a job 302. In some examples, once the job 302 starts (e.g., the job 302 is called by a user, the job 302 is called by another process, the job 302 receives vehicle data), the execution management component may update the compute graph nodes to reflect additional or alternate data related to execution of the plurality of components. For example, the execution management component may update a status associated with a component and/or store an output generated based at least in part on execution of the component.

In some examples, the execution management component may determine that a component 402 did not execute successfully. For example, at some point the execution management component may have stored a status indicating that component 402 failed (indicated in FIG. 3 as an "X" through the component 402). In some examples, the execution management component may have received an exit code that indicated a failure of the component 402 to execute successfully. Upon a completion of a run of the job 302, the execution management component may identify the component(s) that failed based at least in part on the status(es) associated with the components of the job 302. In some examples, a run of the job 302 may comprise attempting to execute all of the components of the job. In an additional or alternate example a run of the job 302 may comprise executing component(s) of the job 302 for which no upstream component failed. For example, a component having no upstream components may execute and components of the job 302 may be scheduled after upstream component(s) of a component execute successfully.

If an upstream component fails to execute successfully, the execution management component may determine whether output of the upstream component is necessary for execution (e.g., based at least in part on the execution constraint(s) stored in a compute graph node) and, if the output is necessary, the execution management component may set a status of the component and any component(s) downstream from the component to indicate that they were not run. The execution management component may attempt to execute other component(s) not dependent on the failed upstream component. For example, upon determining that component 402 failed to execute successfully, the execution management component may suspend execution of component 404.

Once the execution management component determines that a component (e.g., component 402) failed to execute successfully, the execution management component may identify component(s) upon which the component 402 depends. In the depicted example, component 402 is related directly or indirectly to the components indicated with black fill. The component 402 depends directly on component 406 and component 408. In some examples, the execution management component may determine whether the components upon which the component 402 depends executed successfully and/or whether an output was stored for the component(s). Successful execution and storage of an output is represented as a square with a checkmark therein and failure of a component and/or failure to store an output associated with a component is represented as a square with an "x" therein.

In some examples, the execution management component may determine those component(s) upon which the component 402 directly depends (i.e., component 406 and component 408) or, in other examples, the execution management component may determine any of the component(s) upon which the component 402 depends, directly or indirectly (i.e., the black-filled circles). The execution management component may retrieve any outputs associated with components upon which the component 402 depends, whether directly and/or indirectly. In some instances, the execution management component may retrieve output(s) stored in association with execution of component(s) upon which the component 402 directly depends and check to ensure that component(s) upon which the component 402 indirectly depends executed successfully. In the depicted example, this may include the output 410 associated with component 406. For any upstream components that the execution management component determines failed to execute successfully and/or for which an output was not stored (i.e., component 408), the execution management component may cause the upstream component 408 to re-execute to obtain an output defined by a compute graph node as being used by the component 402 for execution.

Once the execution management component has obtained the input(s) defined by the compute graph node associated with component 402 as being used as input for execution of the component 402, the execution management component may cause component 402 to be re-executed in accordance with re-execution instructions associated with the component 402. If no re-execution instructions are set by a compute graph node associated with component 402, the execution management component may implement a default set of re-execution instructions, such as re-executing the component 402 a fixed number of times. In some examples, if the component 402 is not successfully executed after re-executing according to the re-execution instructions (or default set of re-execution instructions), the execution management component may generate a notification that the component 402 failed and/or set a status of the component 402 as a "fatal failure." In some examples, the execution management component may transmit the notification, store the notification, and/or cause the notification to be displayed. In some examples, if the component 402 fatally fails, downstream components may be suspended from executing or the downstream components may be executed without an output provided from the component 402. In the latter example, the execution management component may provide a default output to a downstream component (e.g., as a default input to the downstream component) instead of an output from the component 402. For example, where the component 402 would normally determine a covariance from sensor data, upon repeated failure and/or fatal failure of the component 402, the execution management component may provide a value stored in memory to downstream component(s) in place of the covariance determined by the component 402. The value stored in memory could be a "typical" or average covariance, for example.

If the component 402 successfully executes upon re-execution, the execution management component may cause downstream component(s) to execute (or re-execute) based at least in part on an output of the component 402, responsive to successful execution of the component 402. For example, the execution management component may cause component 404 to execute or re-execute.

In an additional or alternate example, if a compute graph node associated with component 402 was modified and/or added after a run of job 302 (e.g., the component 402 was replaced with another component, a definition associated with the compute graph node was modified, a component was added to the pipeline), the execution management component may similarly determine upstream component(s) upon which the compute graph node depends and/or whether output(s) associated therewith were stored. For example, a component may be replaced with new code, a patch (e.g., a bug fix), other form of update, etc. and/or an additional component may be added to add a new function to the job, improve the output of another component, improve an ultimate output of the job, etc. The execution management component may cause the component associated with the modified and/or added compute graph node to execute or re-execute based at least in part on output(s) retrieved from memory and/or output(s) received responsive to causing upstream component(s) to re-execute.

In some examples, the execution management component may cause an output associated with a stage to be stored in addition to or instead of output(s) of individual component(s). For example, a stage may comprise multiple component(s). In an additional or alternate example, the execution management component may determine to delete a stored output associated with a first component for which the execution management component determines that all downstream component(s) thereof have executed successfully and have had all output(s) thereof stored. This may reduce memory usage, but this may also cause execution management component to cause the first component to re-execute if a component is added that depends on the first component and/or if one of the downstream component(s) is replaced. However, the risk of re-execution may be small and acceptable in some cases. In some examples, the compute graph node may identify whether or not an output of the component may be deleted in such a manner and/or the job 302 may be associated with a pruning value that determines how aggressively the execution management component deletes such outputs. For example, a low value of the pruning value may indicate that the execution management component may delete output(s) for a component associated with two or more layers of downstream components that have executed successfully and that have had outputs thereof stored.

Example Process

Figure 5A:
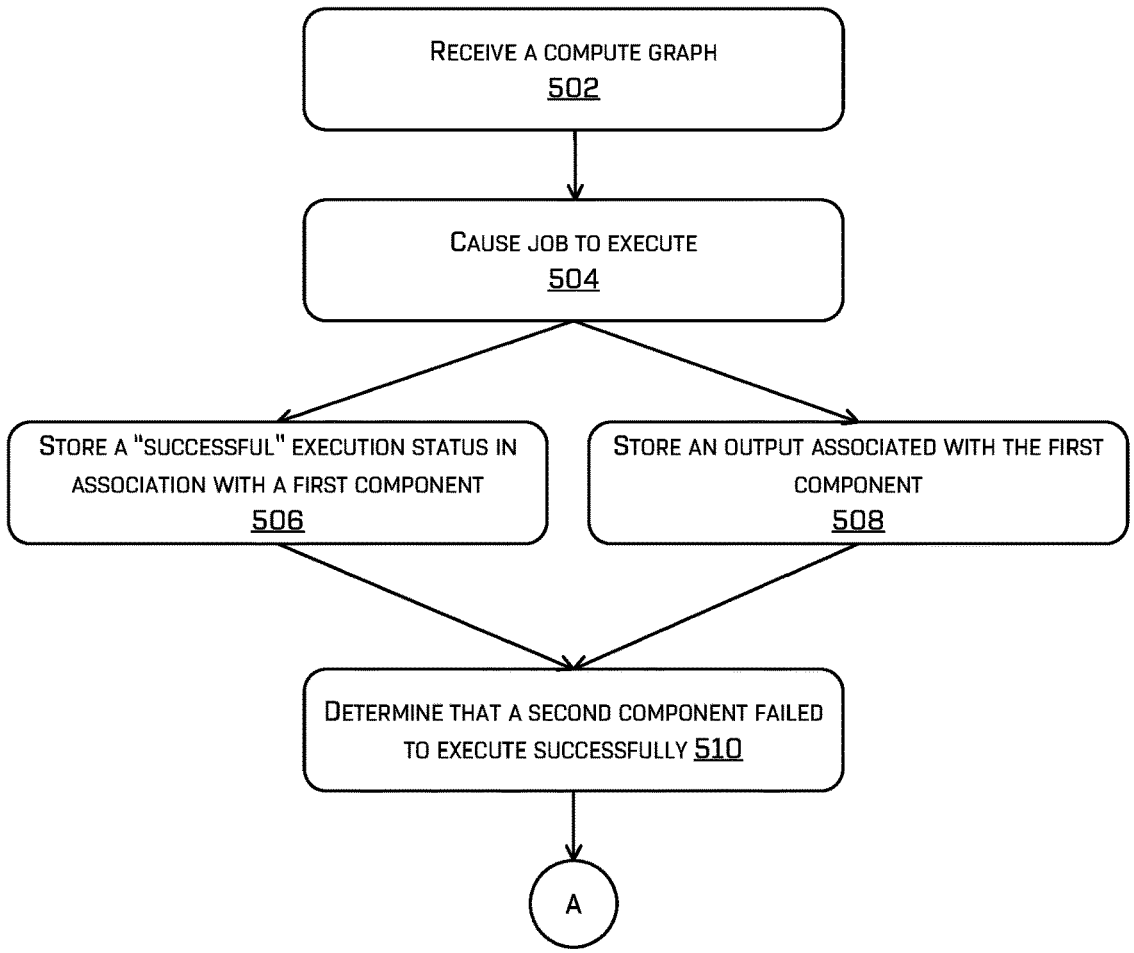
FIGS. 5A and 5B illustrate a flow diagram of an example process for detecting failure(s) of a job and/or recovering from such failures.
Figure 5B:
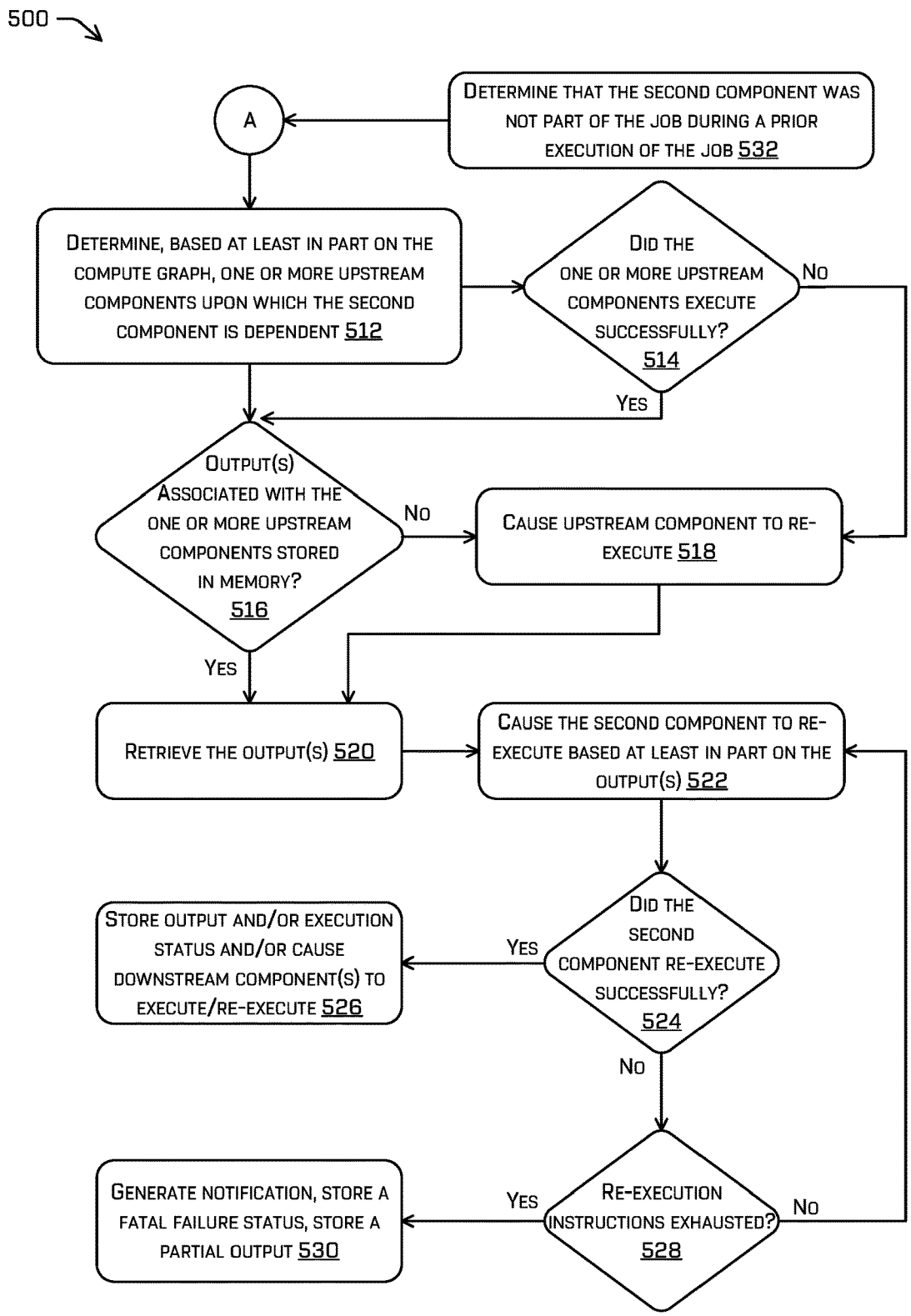

FIGS. 5A and 5B illustrate a flow diagram of an example process 500 for detecting failure(s) of a job, such as a data processing pipeline or process, and/or recovering from such failures. The recovery techniques discussed herein reduce computation time As depicted in FIG. 5A, at operation 502, example process 500 may comprise receiving a compute graph, according to any of the techniques discussed herein. For example, an execution management component may receive a compute graph node associated with a component and may generate a compute graph based at least in part on two or more compute graph nodes received at the execution management component. In some examples, the components associated with the compute graph may be associated with a job such as a data processing pipeline, an application, etc.

At operation 504, example process 500 may comprise causing the job to execute, according to any of the techniques discussed herein. In some examples, the example process 500 may also comprise receiving vehicle data and/or providing the vehicle data to the job as an argument (input). For example, the vehicle data may comprise a log file stored by an autonomous vehicle that the autonomous vehicle generated based at least in part on operating the autonomous vehicle. The vehicle data may comprise sensor data, perception data, planner data, teleoperation data, passenger data, etc.

At operation 506, example process 500 may comprise storing a "successful" execution status in association with a first component, according to any of the techniques discussed herein. For example, the execution management component and/or a scheduler may, as a part of causing the job to execute, cause the first component to be scheduled for execution. In some examples, the execution management component may receive an exit code and/or any other indication of a result of the attempted execution of the first component. If the indication indicates that the first component executed successfully, the execution management component may update the compute graph (e.g., at a compute graph node associated with the first component) to indicate that the first component executed successfully. In some examples, updating the compute graph may comprise storing the indication and/or an execution status in memory. In some examples, the indication itself may be used as the execution status (e.g., an exit code may be stored as the execution status). The execution management component may continuously update execution status(es) associated with components of the job as the status changes. In some examples, the execution management component may, at the start of a job execution, initialize the execution statuses to "pending." For example, an execution status for a respective compute graph node associated with a component may transition from pending to scheduled to paused, canceled, failed, fatally failed, or successful.

At operation 508, example process 500 may comprise storing an output associated with the first component, according to any of the techniques discussed herein. For example, the execution management component may store any outputs received responsive to execution of the first component. In some examples, the execution management component may store the output(s) of the first component, even when an execution status of the first component does not ultimately end in a "successful" execution status. That way, the execution management component may store outputs received responsive to a partial execution of a component, which may be useful for downstream components even if the first component didn't execute successfully (e.g., which may include failing to execute completely).

In some examples, the execution management component may additionally or alternatively store ancillary data such as, for example, a time that the component 204 was scheduled to execute, started executing, finished executing, etc., an environment in which the component 204 was executed (e.g., a machine that executed the component 204, hardware associated with the execution), a reason for failure of the component 204 (e.g., this may be determined from an exit code and/or other information determined by a monitoring service).

At operation 510, example process 500 may comprise determining that a second component failed to execute successfully, according to any of the techniques discussed herein. For example, this may comprise receiving, at the execution management component and based at least in part on scheduling the second component for execution, an indication that the second component did not execute successfully and/or storing an execution status in the compute graph (e.g., at a compute graph node associated with the second component) that indicates that the second component failed to execute successfully and/or a reason for failure. In some examples, the component, itself, may determine that the component failed to execute successfully, and the component may provide an indication of such failure (e.g., by associating a notification with the exit code, by notifying the execution management component). In an additional or alternate example, the execution management component may update the statuses of the components of a job until the job reaches a completion point (e.g., the job gets as far as it can, whether that means the job finishes or not). The execution management component may then search the (updated) compute graph for compute graph nodes that comprise an execution status that indicates that the corresponding component did not execute successfully.

Turning to FIG. 5B, at operation 512, example process 500 may comprise determining one or more upstream components upon which the second component is dependent, according to any of the techniques discussed herein. In some examples, this may comprise determining, based at least in part on the compute graph, compute graph nodes that are directly and/or indirectly upstream from the compute graph node associated with the second component. In some examples, the execution management component may read the compute graph node associated with the second component to determine the upstream component(s) and/or input(s) specified by the compute graph node to determine the one or more upstream components upon which the second component is dependent. In some examples, determining dependency may be bifurcated into hard dependencies and/or soft dependencies, although additional classifications are contemplated.

At operation 514, example process 500 may comprise determining whether the one or more upstream components executed successfully, according to any of the techniques discussed herein. For example, the execution management component may determine whether execution status(es) associated with the one or more upstream components indicate that the one or more upstream components executed successfully.

At operation 516, example process 500 may comprise determining whether output(s) have been stored in association with the one or more upstream components, according to any of the techniques discussed herein. In some examples, even if a component did not execute successfully, the execution management component may determine that an output was stored in association with the upstream component and that the output may be used by the second component for re-execution. In some instances, the execution management component may determine that an execution status stored in association with the upstream component and/or the output indicates that the output is usable (or unusable). For example, the execution management component may determine that the output is usable if the execution status indicates that the upstream component was paused or an exit code indicates that a higher priority component caused execution of the component to cease, but the execution management component may determine that the output is unusable if the execution status indicates that an input to the upstream component was missing.

If an upstream component of the one or more upstream components did not execute successfully and/or if an output was not stored in associated with execution of an upstream component of the one or more upstream components, at operation 518, example process 500 may comprise causing the upstream component to re-execute (or execute). In some examples, operation 518 may additionally or alternatively comprise storing an output received responsive to causing the upstream component to re-execute. In some such examples, re-executing such upstream components may comprise using previously stored outputs (and/or internal states) from one or more components further upstream.

At operation 520, example process 500 may comprise retrieving the output(s) associated with the one or more upstream components, according to any of the techniques discussed herein. In some examples, the execution management component may retrieve the output(s) based at least in part on determining that all the output(s) associated with a hard dependency are available. In an additional or alternate example, the execution management component may, based at least in part on a re-execution instruction, wait to retrieve the output(s) until the execution management component determines that all the output(s) are available for a first n-number of re-executions of the second component, but for n+1 and subsequent re-executions of the second component the execution management component may retrieve the output(s) based at least in part on determining that the output(s) associated with a hard dependency are available.

At operation 522, example process 500 may comprise causing the second component to re-executed based at least in part on the output(s), according to any of the techniques discussed herein. In some examples, the execution management component may provide the retrieve output(s) as argument(s) (input(s)) to the second component. In some instances, the execution management component may determine to change execution parameters associated with re-execution of the second component compared to previous re-executions and/or the first execution of the second component, based at least in part on the re-execution instructions. For example, the re-execution instructions (or a default set of re-execution instructions) may migrate execution of the second component to a different machine upon re-execution, if a different machine is available, the execution management component may wait to cause the second component to re-execute until a temperature and/or memory/processor usage declines below a threshold, etc.

In some examples, operation 522 may comprise adding the second component to an execution queue and/or removing components from the execution queue except for the second component, component(s) downstream from the second component, and/or any components upstream from the second component that are identified for re-execution (e.g., if no output is stored in association therewith, if the upstream component didn't execute successfully). In some examples, during a first execution of the job, the execution queue may include the components of the job, but for a re-execution, the execution management component may add failed components and/or components associated therewith (e.g., downstream components, upstream components for which no output is stored) to the execution queue.

In some examples, operation 522 may additionally or alternatively comprise causing the second component to re-execute based at least in part on dependenc(ies) indicated by the compute graph. For example, this may comprise providing output(s) to the second component from upstream components and/or sequencing execution of the second component relative to other component(s) (e.g., to prevent resource overload, e.g., the second component may be identified at a compute graph node associated with the second component as being a computationally "heavy" component. This operation may suspend execution of the second component until another "heavy" component finishes executing, for example), interleaving output(s) of the second component and one or more other components, etc.

At operation 524, example process 500 may comprise determining whether the second component re-executed successfully, according to any of the techniques discussed herein. If the execution management component determines that the second component re-executed successfully (e.g., an indication is received at the execution management component that the second component executed successfully, such as by receiving an exit code; the execution management component updates the execution status associated with the second component to a "successful" execution status), at operation 526, the example process 500 may comprise storing an output associated with execution of the second component, updating the execution status associated with the second component, and/or causing downstream component(s) to execute and/or re-execute. In some examples, as discussed above, the execution management component may store output of the second component regardless of an execution status of the second component (e.g., the execution management component may store output received from the second component even if the execution ultimately doesn't result in a successful execution).

In some examples, operation 526 may comprise identifying one or more downstream components from the second component, based at least in part on the compute graph. During execution of the job, the one or more downstream components may have been suspended if the one or more downstream components depended on the second component as a hard dependency. Downstream components that softly depended on the second component may have executed (e.g., by passing default data, or otherwise, to have subsequent components execute regardless of the state and/or output of the second component). Therefore, the execution management component may cause any downstream components that were suspended to execute based at least in part on output of the second component and/or cause any downstream components that previously executed, but weren't able to use output of the second component, to execute based at least in part on output of the second component.

At operation 528, if the second component did not re-execute successfully, example process 500 may comprise determining whether the re-execution instructions are exhausted, according to any of the techniques discussed herein. For example, the execution management component may determine that the second component has been re-executed a number of times that matches a number of a re-executions specified by the re-execution instructions. In an additional or alternate example, determining that the re-execution instructions have been exhausted may comprise determining that re-executions have been based at least in part on alternate execution configurations included in the re-execution instructions. In some examples, this may comprise determining that permutations of the execution constraint(s) 214 have been exhausted (e.g. the execution constraint(s) 214 may specify that the component may be executed on any type of processor and operation 528 may determine that two types of processors are available (e.g., CPU, GPU) and may determine that the re-execution instructions are exhausted once the component has been re-executed on both types of processors). For example, a first alternate execution configuration may specify changing an IP address to which the second component transmits a request, a second alternate execution configuration may specify changing a core upon which the second component is executed, a third alternate execution configuration may specify that the second component should be switched from allowing hyperthreading to disallowing hyperthreading, and/or combinations thereof, etc. If the execution management component determines that the re-execution instructions have not been exhausted, the execution management component may return to operation 522, which may include altering an execution configuration of the second component for the re-execution compared to previous re-executions and/or the first execution.

At operation 530, if the execution management component determines that the re-execution instructions have been exhausted, example process 500 may comprise generating a notification, storing a fatal failure status (e.g., updating the execution status associated with the second component in the compute graph), and/or storing a partial output associated with the execution and/or re-execution(s) of the second component, according to any of the techniques discussed herein. In some examples, the execution management component may cause a notification to be displayed via a user interface and/or may store the notification in association with execution of the job. The notification may comprise data stored in the compute graph node associated with the second component and/or information about the attempted execution configurations tried during the re-execution(s) of the second component.

In an additional or alternate example, at operation 530, example process 500 may comprise determining that the second component was not part of the job during a prior execution of the job. For example, the second component may have been added to the job and/or replaced another component of the job. In an additional or alternate example, data associated with a compute graph node associated with the second component may have been altered since a prior execution of the job (e.g., a soft dependency was changed to a hard dependency, the second component relies on one less or an additional upstream component for input). Regardless, the execution management component may receive a compute graph node identifying the second component and/or containing alterations to the compute graph node. The execution management component may determine that the second component is an addition and/or replacement and/or that the compute graph node associated therewith was modified and update the compute graph accordingly. The execution management component may then proceed to any of operation(s) 512-530.

In an additional or alternate example, at operation 530, example process 500 may comprise determining that the component is associated with one or more negative dependencies. A negative dependency may indicate a component that should be executed only upon failure of the component and/or exhaustion of the re-execution instructions. For example, a component associated with a negative dependency may comprise a cleanup component (e.g., clearing memory to prevent memory leakage or future failures, resetting a component), a notification component (e.g., a component that causes a notification to be displayed via a user interface), etc. In some examples, a notification component may comprise a component that cause a phone call, an SMS message, and/or an email to be transmitted to one or more contacts stored in memory.

Example Architecture

Figure 6:
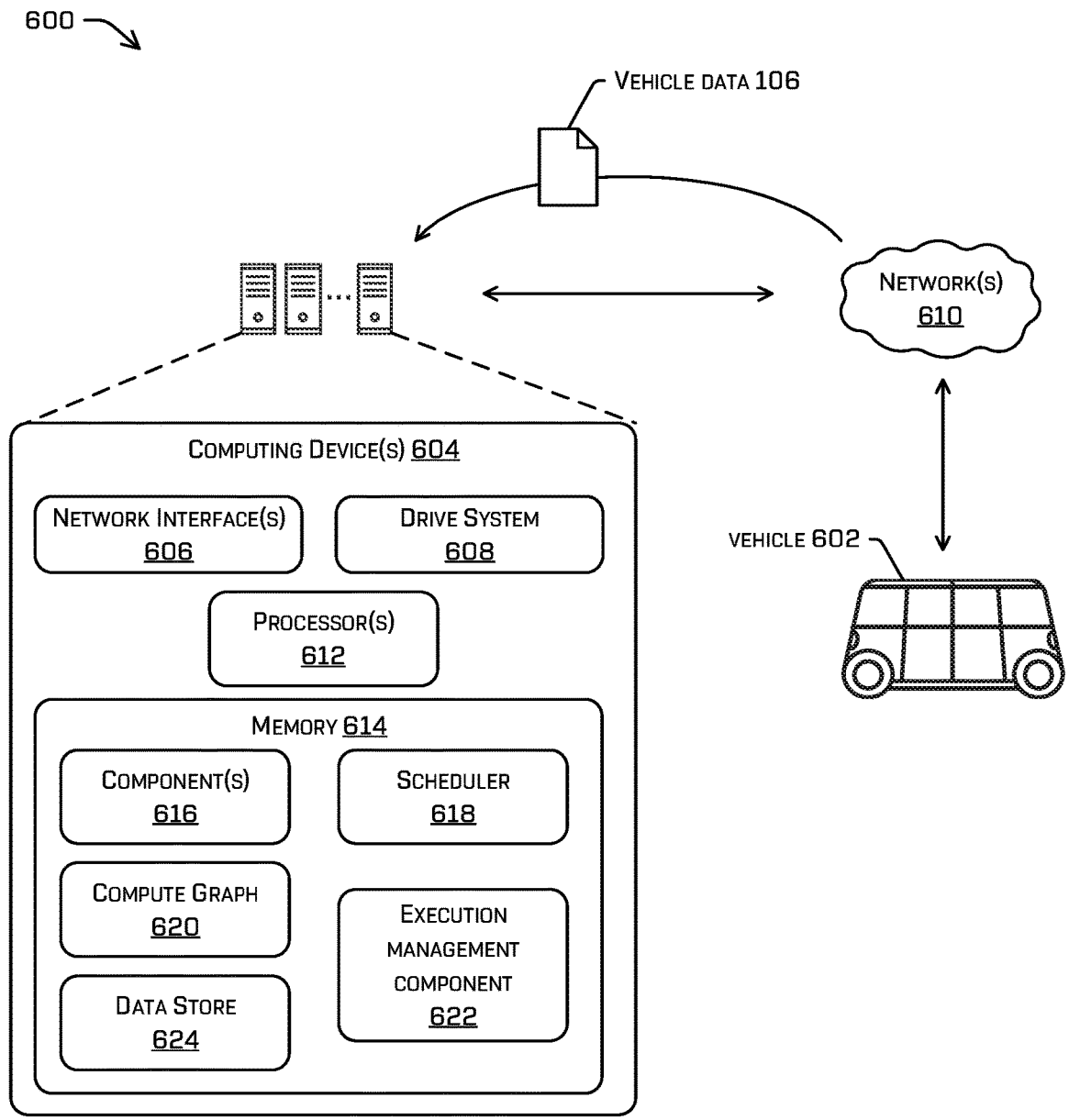
FIG. 6 illustrates a block diagram of an example architecture that implements the failure recovery techniques discussed herein.

FIG. 6 illustrates a block diagram of an example architecture 600 that implements the failure recovery techniques discussed herein. In some instances, the example architecture 600 may include a vehicle 602, which may correspond to the autonomous vehicle 102 in FIG. 1. In some instances, the vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 602 may be a fully or partially autonomous vehicle having any other level or classification. Moreover, in some instances, the techniques described herein may be usable by non-autonomous vehicles as well.

In some examples, the example architecture 600 may additionally or alternatively comprise computing device(s) 604. In some examples, vehicle 602 may comprise the computing device(s) 604. The computing device(s) 604 may comprise one or more nodes of a distributed computing system (e.g., a cloud computing architecture).

The computing device(s) 604 may include network interface(s) 606 that enable communication between the vehicle 602 and one or more other local or remote computing device(s). For instance, the network interface(s) 606 may facilitate communication with other local computing device(s) on the vehicle 602 and/or a drive system 608, in examples where the vehicle 602 comprises the computing device(s) 604. Also, the network interface (s) 606 may additionally or alternatively allow the computing device(s) 604 to communicate with other nearby computing device(s) (e.g., other nearby vehicles, traffic signals, etc.). The network interface(s) 606 may additionally or alternatively enable the vehicle 602 to communicate with computing device(s) 604.

The network interface(s) 606 may include physical and/or logical interfaces for connecting the computing device(s) 604 to another computing device or a network, such as network(s) 610. For example, the network interface(s) 606 may enable Wi-Fi-based communication such as via frequencies defined by the IEEE 800.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle 602 may send vehicle data 106, via the network(s) 610, to the computing device(s) 604 at a particular frequency, after a lapse of a predetermined period of time, in near real-time, etc.

In some examples, vehicle data 106 may comprise sensor data received from sensor(s) of the vehicle 602 such as, for example, light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), etc. The sensor(s) may include multiple instances of each of these or other types of sensors.

In some examples where the vehicle 602 includes the computing device(s) 604, the computing device(s) 604 may include a drive system 608. In some instances, the drive system 608 may include one or more sensors to detect conditions of the drive system 608 and/or the surroundings of the vehicle 802. By way of example and not limitation, the sensor(s) of the drive system 608 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders may be unique to the drive system 608. In some cases, the sensor(s) on the drive system 608 may overlap or supplement corresponding systems of the vehicle 802 (e.g., sensor(s) discussed above).

The drive system 608 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system 608 may include a drive module controller which may receive and preprocess data from the sensor(s) and to control operation of the various vehicle systems. In some instances, the drive module controller may include one or more processors and memory communicatively coupled with the processor(s) 612. The memory 614 may store instructions to perform various functionalities of the drive system 608. Furthermore, the drive system 608 may also include one or more communication connection(s) that enable communication by the respective drive module with one or more other local or remote computing device(s).

The computing device(s) 604 may include one or more processors 612 and memory 614 communicatively coupled with the one or more processors 612. The processor(s) 612 may be any suitable processor capable of executing instructions to process data and perform operations as described herein. By way of example and not limitation, the processor(s) 612 may comprise one or more central processing units (CPUs), graphics processing units (GPUs), integrated circuits (e.g., application-specific integrated circuits (ASICs), etc.), gate arrays (e.g., field-programmable gate arrays (FPGAs), etc.), and/or any other device or portion of a device that processes electronic data to transform that electronic data into other electronic data that may be stored in registers and/or memory.

Memory 614 may be an example of non-transitory computer-readable media. The memory 614 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 614 may store component(s) 616 such as, for example, component(s) of a primary perception system, a secondary perception system, a prediction system, a localization system, a mapping system, a planning system, a ride management system, a training data mining system, a machine-learned model training system, a log generating system, etc. These (and other) system(s) may comprise a variety of components that make up a job/data processing pipeline. Although component(s) 616 are illustrated as being stored in memory 614, component(s) 616 may include processor-executable instructions, machine-learned model(s) (e.g., a neural network), and/or hardware. In some examples, a may entirely or, in part, comprise hardware such as, for example, a DAC, sensor driver, amplifier, etc.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet60, ResNet101, VGG, DenseNet, PointNet, and the like.

Memory 614 may additionally or alternatively store a scheduler 618, a compute graph 620, and/or an execution management component 622. Memory 614 may additionally or alternatively comprise a data store 624. In some examples, the data store 624 may be separate from memory 614 (e.g., accessible via network(s) 610). In some examples, the scheduler 618 may be a scheduler associated with a processor, operating system, hypervisor, and/or the like. The scheduler 618 and/or hardware associated therewith may maintain an execution queue. The execution management component 622 may coordinate with the scheduler 618 to add component(s) of a job to the execution queue. In some examples, the execution management component 622 may cause the scheduler 618 to start running a job and may update execution status(es) stored in the compute graph 620 and/or store output(s) in the data store 624 responsive to component(s) executing. In some examples, updating the execution status(es) may be based at least in part on exit code(s) received from the scheduler 618.

In some examples, when the execution management component 622 detects that a component failed to execute successfully, the execution management component 622 may, instead of allowing the scheduler 618 to run the job according to a configuration of the scheduler 618, provide the specific components to be run and/or an order thereof to the scheduler 618. Allowing the scheduler 618 to re-execute a component according to a default configuration of the scheduler 618 may result in re-executing the entire job, which duplicates computations compared to the techniques discussed herein. In some examples, the execution management component 622 may transmit to the scheduler 618 information associated with a compute graph node in addition to instructions to execute a component associated with the compute graph node.

In some examples, the compute graph 620 may comprise a primary compute graph and/or one or more alternate compute graphs. In some examples, based at least in part on determining to re-execute a component, the execution management component 622 may determine to replace the primary compute graph with an alternate compute graph based at least in part on re-execution instructions stored in association with the job or a component of the job.

Example Clauses

A. A method comprising: receiving a compute graph associated with a data processing pipeline, the compute graph identifying one or more computer-executable components of the data processing pipeline and dependencies therebetween; causing the data processing pipeline to execute; storing, based at least in part on receiving a first exit code received responsive to causing the data processing pipeline to execute, a first indication that a first component of the data processing pipeline executed successfully; storing a first output received from the first component responsive to execution of the first component; storing, based at least in part on receiving a second exit code responsive to causing the data processing pipeline to execute, a second indication that a second component of the data processing pipeline failed to execute successfully; determining to re-execute a portion of the data processing pipeline based at least in part on the second indication, the portion comprising at least one of the second component or one or more additional components downstream of the second component; and causing the portion to re-execute according to the compute graph.

B. The method of paragraph A, wherein causing the portion to re-execute according to the compute graph comprises: causing the second component to re-execute; and at least one of providing the first output as input to the second component or sequencing execution of the second component relative to another component, wherein the compute graph indicates that the second component is dependent upon the first component.

C. The method of either paragraph A or B, wherein causing the portion to re-execute comprises: causing the second component to re-execute one or more times until the second component successfully completes or based at least in part on determining that a number of re-executions meets a number of retries specified by the compute graph in association with the second component.

D. The method of any one of paragraphs A-C, wherein causing the portion to re-execute further comprises: causing the one or more additional components to at least one of execute or re-execute based at least in part on the second component successfully executing or re-executions meeting the number of retries.

E. The method of any one of paragraphs A-D, wherein, based at least in part on determining that the number of re-executions meets the number of retries, at least one of: transmitting a default output to one or more components downstream from the second component, or preventing the one or more components downstream from the second component from executing.

F. The method of any one of paragraphs A-E, wherein the compute graph further identifies at least one of: a computer-executable instruction associated with the second component, one or more constraints associated with executing the second component, a minimum set of inputs required to execute the second component, a first instruction associated with failure of the second component, a second instruction associated with a fatal failure of the second component, or a number of re-execution attempts associated with generating a fatal failure indication.

G. A system comprising: one or more processors; and memory storing processor-executable instructions that, when executed by the one or more processors, cause the system to perform operations comprising: receiving a compute graph associated with a data processing pipeline, the compute graph identifying one or more components of the data processing pipeline and dependencies therebetween; causing the one or more components to execute; storing, based at least in part on receiving a first exit code in association with execution of a first component, a first indication that execution of the first component of the one or more components executed successfully; storing, based at least in part on the execution of the first component, an output from the first component; storing, based at least in part on receiving a second exit code in association with execution of a second component, a second indication that the second component of the one or more components failed to execute successfully; retrieving, as a retrieved output, the output; and causing the second component to re-execute, as a re-execution, based at least in part on the retrieved output.

H. The system of paragraph G, wherein the operations further comprise: storing, based at least in part on receiving a third exit code in association with the re-execution of the second component, a third indication that the second component executed successfully; storing, based at least in part on the re-execution of the second component, a second output from the second component; and causing one or more components downstream from the second component to execute or re-execute based at least in part on the second output.

I. The system of either paragraph G or H, wherein the compute graph further identifies at least one of: a set of computer readable instructions associated with the second component, one or more constraints associated with executing the second component, a minimum set of inputs required to execute the second component, a first instruction associated with failure of the second component, a second instruction associated with a fatal failure of the second component, or a number of re-execution attempts associated with generating a fatal error indication.

J. The system of any one of paragraphs G-I, wherein the second instruction causes the re-execution of the second component to at least one of: cause one or more components downstream from the second component to execute or re-execute based at least in part on a default output associated with the second component, alter a computational environment of the re-execution compared to a prior execution of the second component.

K. The system of any one of paragraphs G-J, wherein the first instruction or the second instruction alters a computational environment associated with re-execution of the second component compared to a prior execution of the second component, wherein altering the computational environment comprises altering at least one of: a type of hardware associated with re-execution of the second component; an operating system associated with re-execution of the second component; a network associated with re-execution of the second component; a memory associated with re-execution of the second component; a hypervisor associated with re-execution of the second component; a machine that re-executes the second component; a cluster that comprises the machine re-executing the second component; a physical threshold associated with re-execution of the second component; a minimum security requirement associated with re-execution of the second component; a licensing requirement associated with re-execution of the second component; or a budgetary constraint associated with re-execution of the second component.

L. The system of any one of paragraphs G-K, wherein the operations further comprise: causing the second component to re-execute until the second component successfully executes or determining that a number of re-executions meets a number of retries specified by the compute graph in association with the second component.

M. A non-transitory computer-readable medium comprising processor-executable instructions that, when executed by one or more processors, cause the processors perform operations comprising: receiving a compute graph associated with a job, the compute graph identifying two or more components of the job and dependencies therebetween; causing the one or more components to execute; storing, based at least in part on receiving a first exit code in association with execution of a first component, a first indication that the execution of the first component of the one or more components executed successfully; storing, based at least in part on the execution of the first component, an output from the first component; storing, based at least in part on receiving a second exit code in association with execution of a second component, a second indication that the second component of the one or more components failed to execute successfully; and causing the second component to re-execute, based at least in part on the second indication.

N. The non-transitory computer-readable medium of paragraph M, wherein the operations further comprise: determining that the compute graph indicates a dependency of the second component on the first component; wherein causing the second component to re-execute further comprises providing the output to the second component.

O. The non-transitory computer-readable medium of either paragraph M or N, wherein the operations further comprise: storing, based at least in part on receiving a third exit code in association with the re-execution of the second component, a third indication that the second component executed successfully; storing, based at least in part on the re-execution of the second component, a second output from the second component; and causing one or more components downstream from the second component to execute or re-execute based at least in part on the second output.

P. The non-transitory computer-readable medium of any one of paragraphs M-O, wherein the compute graph further identifies at least one of: a computer-executable instruction associated with the second component, one or more constraints associated with executing the second component, a minimum set of inputs required to execute the second component, a first instruction associated with failure of the second component, a second instruction associated with a fatal failure of the second component, or a number of re-execution attempts associated with generating a fatal error indication.

Q. The non-transitory computer-readable medium of any one of paragraphs M-P, wherein the one or more constraints comprises at least one of: a preferred or required type of hardware; an operating system; a network requirement; a memory requirement; a virtual machine requirement; a machine topology; a cluster topology; a physical threshold; a security requirement; a licensing requirement; or a budgetary constraint.

R. The non-transitory computer-readable medium of any one of paragraphs M-Q, wherein the second instruction causes the re-execution of the second component to at least one of: output a default output stored in a portion of memory associated with the second component, or alter a computational environment of the re-execution compared to a prior execution of the second component.

S. The non-transitory computer-readable medium of any one of paragraphs M-R, wherein the operations further comprise: causing the second component to re-execute until the second component successfully executes or determining that a number of re-executions meets a number of retries specified by the compute graph in association with the second component.

T. The non-transitory computer-readable medium of any one of paragraphs M-S, wherein the operations further comprise: causing one or more components downstream from the second component to at least one of: execute or re-execute based at least in part on the second component successfully executing or re-executions meeting the number of retries, or prevent the one or more components downstream from the second component from executing.

U. The non-transitory computer-readable medium of any one of paragraphs M-T, wherein the operations further comprise: receiving, after the one or more components executed, an indication that an additional component replaced, as a replacement, the second component or was added; updating the compute graph to reflect the replacement; determining, based at least in part on the compute graph, whether a downstream component depends on the replacement for input and whether the replacement depends on an upstream component for input; and at least one of causing the additional component to execute based at least in part on retrieving a first input associated with a previous successful execution of the upstream component, or re-executing the downstream component based at least in part on a second output associated with a successful execution of the replacement.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Moreover, such elements and/or blocks in the flow diagrams, when depicted serially, may additionally or alternatively be arranged in any order and/or performed in parallel.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving a compute graph associated with a data processing pipeline, the compute graph identifying one or more computer-executable components of the data processing pipeline and dependencies therebetween;
   causing the data processing pipeline to execute;
   storing, based at least in part on receiving a first exit code received responsive to causing the data processing pipeline to execute, a first indication that a first component of the data processing pipeline executed successfully;
   storing, individually in association with the first component and based at least in part on the first indication, a first output determined by the first component as a result of execution of the first component;
   storing, based at least in part on receiving a second exit code responsive to causing the data processing pipeline to execute, a second indication that a second component of the data processing pipeline failed to execute successfully;
   determining to re-execute a portion of the data processing pipeline starting at the second component based at least in part on the second indication, wherein re-executing the second component comprises providing the first output as input to the second component, and wherein the portion comprising at least one of the second component or one or more additional components downstream of the second component; and
   causing the portion to re-execute according to the compute graph.

2. The method of claim 1, wherein causing the portion to re-execute according to the compute graph comprises:
   causing the second component to re-execute; and
   at least one of providing the first output as input to the second component or sequencing execution of the second component relative to another component, wherein the compute graph indicates that the second component is dependent upon the first component.

3. The method of claim 1, wherein causing the portion to re-execute comprises:
   causing the second component to re-execute one or more times until the second component successfully completes or based at least in part on determining that a number of re-executions meets a number of retries specified by the compute graph in association with the second component.

4. The method of claim 3, wherein causing the portion to re-execute further comprises:
   causing the one or more additional components to at least one of execute or re-execute based at least in part on the second component successfully executing or re-executions meeting the number of retries.

5. The method of claim 3, wherein, based at least in part on determining that the number of re-executions meets the number of retries, at least one of:
   transmitting a default output to one or more components downstream from the second component, or
   preventing the one or more components downstream from the second component from executing.

6. The method of claim 1, wherein the compute graph further identifies at least one of:
   a computer-executable instruction associated with the second component,
   one or more constraints associated with executing the second component,
   a minimum set of inputs required to execute the second component,
   a first instruction associated with failure of the second component,
   a second instruction associated with a fatal failure of the second component, or
   a number of re-execution attempts associated with generating a fatal failure indication.

7. The method of claim 1, further comprising:
   receiving a third indication that a modification to the data processing pipeline was made, wherein the modification includes at least one of adding a third component to the data processing pipeline, replacing a fourth component of the data processing pipeline with a fifth component, or removing a sixth component of the data processing pipeline;
   determining an updated compute graph based at least in part on the third indication; and
   determining to re-execute a second portion of the data processing pipeline based at least in part on the third indication, the second portion comprising at least one of the third component, the fourth component, the fifth component, or one or more components indicated as being dependent upon the sixth component.

8. A system comprising:
   one or more processors; and
   memory storing processor-executable instructions that, when executed by the one or more processors, cause the system to perform operations comprising:
   receiving a compute graph associated with a data processing pipeline, the compute graph identifying one or more components of the data processing pipeline and dependencies therebetween;
   causing the one or more components to execute;
   storing, based at least in part on receiving a first exit code in association with execution of a first component, a first indication that execution of the first component of the one or more components executed successfully;
   storing, in association with the first component and based at least in part on the execution of the first component, an output determined by the first component as a result of execution of the first component;

storing, based at least in part on receiving a second exit code in association with execution of a second component, a second indication that the second component of the one or more components failed to execute successfully;

retrieving, as a retrieved output, the output; and causing the second component to re-execute, as a re-execution, based at least in part on the retrieved output, wherein the re-execution starts at the second component and wherein re-executing the second component comprises providing the output determined by the first component as input to the second component.

9. The system of claim 8, wherein the operations further comprise:

storing, based at least in part on receiving a third exit code in association with the re-execution of the second component, a third indication that the second component executed successfully;

storing, based at least in part on the re-execution of the second component, a second output from the second component; and causing one or more components downstream from the second component to execute or re-execute based at least in part on the second output.

10. The system of claim 8, wherein the compute graph further identifies at least one of:

a set of computer readable instructions associated with the second component, one or more constraints associated with executing the second component, a minimum set of inputs required to execute the second component, a first instruction associated with failure of the second component, a second instruction associated with a fatal failure of the second component, or a number of re-execution attempts associated with generating a fatal error indication.

11. The system of claim 10, wherein the second instruction causes the re-execution of the second component to at least one of:

cause one or more components downstream from the second component to execute or re-execute based at least in part on a default output associated with the second component, alter a computational environment of the re-execution compared to a prior execution of the second component.

12. The system of claim 10, wherein the first instruction or the second instruction alters a computational environment associated with re-execution of the second component compared to a prior execution of the second component, wherein altering the computational environment comprises altering at least one of:

a type of hardware associated with re-execution of the second component;

an operating system associated with re-execution of the second component;

a network associated with re-execution of the second component;

a memory associated with re-execution of the second component;

a hypervisor associated with re-execution of the second component;

a machine that re-executes the second component;

a cluster that comprises the machine re-executing the second component;

a physical threshold associated with re-execution of the second component;

a minimum security requirement associated with re-execution of the second component;

a licensing requirement associated with re-execution of the second component; or a budgetary constraint associated with re-execution of the second component.

13. The system of claim 10, wherein the operations further comprise:

causing the second component to re-execute until the second component successfully executes or determining that a number of re-executions meets a number of retries specified by the compute graph in association with the second component.

14. A non-transitory computer-readable medium comprising processor-executable instructions that, when executed by one or more processors, cause the processors perform operations comprising:

receiving a compute graph associated with a job, the compute graph identifying two or more components of the job and dependencies therebetween;

causing the two or more components to execute;

storing, based at least in part on receiving a first exit code in association with execution of a first component, a first indication that the execution of the first component of the two or more components executed successfully;

storing, based at least in part on the execution of the first component, an output determined by the first component as a result of execution of the first component;

storing, based at least in part on receiving a second exit code in association with execution of a second component, a second indication that the second component of the two or more components failed to execute successfully; and causing the second component to re-execute, based at least in part on the second indication, wherein the re-execution starts at the second component and wherein re-executing the second component comprises providing the output determined by the first component as input to the second component.

15. The non-transitory computer-readable medium of claim 14, wherein the compute graph further identifies at least one of:

a computer-executable instruction associated with the second component, one or more constraints associated with executing the second component, a minimum set of inputs required to execute the second component, a first instruction associated with failure of the second component, a second instruction associated with a fatal failure of the second component, or a number of re-execution attempts associated with generating a fatal error indication.

16. The non-transitory computer-readable medium of claim 15, wherein the one or more constraints comprises at least one of:

a preferred or required type of hardware;

an operating system;

a network requirement;

a memory requirement;

a virtual machine requirement;

a machine topology;

a cluster topology;

a physical threshold;

a security requirement;
a licensing requirement; or
a budgetary constraint.

17. The non-transitory computer-readable medium of claim 15, wherein the second instruction causes the re-execution of the second component to at least one of:
    output a default output stored in a portion of memory associated with the second component, or
    alter a computational environment of the re-execution compared to a prior execution of the second component.

18. The non-transitory computer-readable medium of claim 14, wherein the operations further comprise:
    causing the second component to re-execute until the second component successfully executes or determining that a number of re-executions meets a number of retries specified by the compute graph in association with the second component.

19. The non-transitory computer-readable medium of claim 18, wherein the operations further comprise:
    causing one or more components downstream from the second component to at least one of:
        execute or re-execute based at least in part on the second component successfully executing or re-executions meeting the number of retries, or
        prevent the one or more components downstream from the second component from executing.

20. The non-transitory computer-readable medium of claim 14, wherein the operations further comprise:
    receiving, after the one or more components executed, an indication that an additional component replaced, as a replacement, the second component or was added; updating the compute graph to reflect the replacement;
    determining, based at least in part on the compute graph, whether a downstream component depends on the replacement for input and whether the replacement depends on an upstream component for input; and
    at least one of causing the additional component to execute based at least in part on retrieving a first input associated with a previous successful execution of the upstream component, or re-executing the downstream component based at least in part on a second output associated with a successful execution of the replacement.

21. The non-transitory computer-readable medium of claim 14, wherein the job is a first job, the compute graph is a first compute graph, and the operations further comprise:
    receiving a second compute graph associated with a second job different than the first job, the compute graph identifying two or more components of the second job and dependencies therebetween wherein at least one of a component identified by the second compute graph is different from a component identified by the first compute graph or a first computing device associated with the component identified by the second compute graph is different from a second computing device associated with the component identified by the first compute graph;
    causing the two or more components of the second job to execute; and
    causing a third component of the two or more components to re-execute, based at least in part on receiving a third exit code indicating that the third component failed to execute successfully.

* * * * *